Patented Nov. 6, 1951

2,573,973

UNITED STATES PATENT OFFICE 2,573,973

THIOCYANATED DERIVATIVE OF TETRA-CHLOROBUTANE

Herbert L. Johnson, Media, and Archibald P. Stuart, Norwood, Pa., assignors to Sun Oil Company, Philadelphia, Pa., a corporation of New Jersey No Drawing. Application September 30, 1950, Serial No. 187,833

6 Claims. (Cl. 260—454)

This invention relates to the preparation of a novel compound, specifically the material obtained upon the reaction of a thiocyanate with 1,2,3,4-tetrachlorobutane, and to the novel material thus prepared. The invention also relates to an insecticidal composition of matter of which the material prepared by the process disclosed in this application is an essential ingredient.

According to the invention a thiocyanate derivative of 1,2,3,4-tetrachlorobutane is prepared by causing 1,2,3,4-tetrachlorobutane to react with a thiocyanate.

The product of this invention can be used also in combination with other known insecticides, or even with 1,2,3,4-tetrachlorobutane.

1,2,3,4-tetrachlorobutane is known to exist in both solid and liquid forms at room temperature. According to the invention the liquid form of 1,2,3,4-tetrachlorobutane can be used in the preparation of the thiocyanated derivative. It is preferable to employ a substantially inert solvent to first dissolve the 1,2,3,4-tetrachlorobutane. Solvents which are suitable are ethanol, methanol, propanol, butanol, methyl isopropyl ketone, methyl isobutyl ketone, etc.

The reaction mass is preferably heated. The temperature of the reaction preferably should be maintained within the range 50° C.–150° C., more preferably in the range 110° C.–130° C.

Preferably, also a catalyst is employed. Catalysts which are suitable are copper powder, and alkali metal iodides and bromides. Alkali metals included within this term are ammonium, sodium, potassium, and others of group I (a) of the periodic table. While the process is operable without a catalyst, in order to insure consistently good results in accordance with the present process, the presence of a catalyst is preferred.

The reaction of the invention does not appear to be restricted to any particular ratio or proportion of the thiocyanate to 1,2,3,4-tetrachlorobutane. Obviously as less thiocyanate is used, less product will result and vice versa. Proportions of from 1 thiocyanate to 2 of 1,2,3,4-tetrachlorobutane—2 thiocyanate to 1 of 1,2,3,4-tetrachlorobutane have been actually employed.

The following examples illustrate the reaction according to the invention as well as the product or material thereby obtained.

Example I

A mixture of 0.44 mol (87 g.) of the liquid isomer of 1,2,3,4-tetrachlorobutane, 0.88 mol (71.3 g.) NaSCN and 2.0 g. Cu powder in 200 ml. of methyl isobutyl ketone was refluxed with stirring for 54 hours in a one-liter three neck flask.

At the end of the reflux period, the mixture was diluted with excess water, filtered, and the filtrate extracted with ether. The solvents and the unreacted 1,2,3,4-tetrachlorobutane were distilled under vacuum, leaving 41 g. of a thiocyanate derivative of 1,2,3,4-tetrachlorobutane. This material cannot be distilled without decomposition.

Anal:
 Calc. for $C_5H_6Cl_3NS,S$, 14.67%
 Found, S, 13.30%

Example II

A mixture of 196 g. (1 mol) of 1,2,3,4-tetrachlorobutane, 40.5 g. (0.5 mol) of sodium thiocyanate, 400 ml. of ethanol, 4.5 g. Cu powder, and 100 ml. of water was stirred and refluxed at atmospheric pressure for twenty-seven hours. The reaction mixture was filtered, the solvents removed under vacuum, and the residue taken up in 500 ml. of boiling petroleum ether, B. P. 65° C.–110° C. and separated from inorganic salts and some insoluble organic matter. The petroleum ether was removed under vacuum, and the excess 1,2,3,4-tetrachlorobutane distilled. There was obtained 28.5 g. of the thiocyanated derivative of 1,2,3,4-tetrachlorobutane and 133 g. of recovered 1,2,3,4-tetrachlorobutane.

As stated, the material of the invention possesses insecticidal properties. The following example illustrates such properties.

Example III

A solution containing five weight percent of the material obtained according to the foregoing examples in Deobase, a commercial deodorized kerosene, was examined for toxicity to houseflies according to the Standard Peet-Grady test.

The results are indicated below:

| | |
|---|---|
| Total No. of flies used | 1012 |
| Sample, % kill 24 hours | 75.6 |
| OTI, % kill 24 hours | 51.2 |
| Difference from OTI | +24.4 |
| Sample knockdown 10 minutes | 98.2 |
| OTI knockdown 10 minutes | 94.3 |
| Difference from OTI | +3.9 |
| Grade designation | AA |

Example IV

In order to illustrate operation of the present process in the absence of a catalyst, a mixture of 88 g. of the liquid isomer of 1,2,3,4-tetrachlorobutane and 40.5 g. NaSCN in 350 ml. of methyl isobutyl ketone and 50 ml. of the mono-ethyl ether of ethylene glycol was refluxed with stirring for 24 hours. The reaction mixture was then washed with water, the washed product extracted with ether, and the ether removed by heating. The residue was taken up in 500 ml. of boiling petroleum ether, B. P. 65° C.–110° C., and insoluble material separated by filtering the hot solution. The petroleum ether was removed under vacuum, and excess 1,2,3,4-tetrachlorobutane was removed by distillation. There was obtained 31 g. of the thiocyanated derivative of 1,2,3,4-tetrachlorobutane and 34 g. of recovered 1,2,3,4-tetrachlorobutane.

This is a continuation-in-part application of Serial No. 10,558, filed February 24, 1948, now abandoned.

The invention claimed is:

1. The reaction product obtained upon causing an alkali metal thiocyanate to react with liquid 1,2,3,4-tetrachlorobutane dissolved in an inert solvent, said reaction being performed at a temperature of from 50° C. to 150° C. in the presence of a catalyst selected from the group consisting of sub-divided metallic copper, an alkali metal bromide, and an alkali metal iodide.

2. The reaction product according to claim 1 wherein the alkali metal thiocyanate is sodium thiocyanate.

3. The process of preparing a monothiocyanated derivative of 1,2,3,4-tetrachlorobutane which comprises reacting an alkali metal thiocyanate with liquid 1,2,3,4-tetrachlorobutane dissolved in an inert solvent, said reaction being performed at a temperature of from 50° C. to 150° C. in the presence of a catalyst selected from the group consisting of sub-divided metallic copper, an alkali metal bromide, and an alkali metal iodide, and separating a monothiocyanated reaction product from the mixture.

4. The process according to claim 3 wherein the alkali metal thiocyanate is sodium thiocyanate.

5. The reaction product obtained by reacting an alkali metal thiocyanate with liquid 1,2,3,4-tetrachlorobutane dissolved in an inert solvent, said reaction being performed at a temperature of from 50° C. to 150° C.

6. The process of preparing a monothiocyanated derivative of 1,2,3,4-tetrachlorobutane which comprises reacting an alkali metal thiocyanate with liquid 1,2,3,4-tetrachlorobutane dissolved in an inert solvent, said reaction being performed at a temperature of from 50° C. to 150° C., and separating a monothiocyanated reaction product from the mixture.

HERBERT L. JOHNSON.
ARCHIBALD P. STUART.

No references cited.